US012758961B2

(12) United States Patent
Kunz et al.

(10) Patent No.: US 12,758,961 B2
(45) Date of Patent: Oct. 13, 2026

(54) PIPETTING UNIT

(71) Applicant: STRATEC SE, Birkenfeld (DE)

(72) Inventors: Klaus Kunz, Waldbronn (DE); Klaus Philipp, Neuenbuerg (DE); Uwe Maschke, Keltern (DE)

(73) Assignee: STRATEC SE, Birkenfeld (DE)

( * ) Notice: Subject to any disclaimer, the term of this patent is extended or adjusted under 35 U.S.C. 154(b) by 723 days.

(21) Appl. No.: 17/969,857

(22) Filed: Oct. 20, 2022

(65) Prior Publication Data

US 2023/0149917 A1 May 18, 2023

(30) Foreign Application Priority Data

Nov. 15, 2021 (LU) ........................................ 102878

(51) Int. Cl.
*B01L 3/02* (2006.01)
*G01N 35/10* (2006.01)

(52) U.S. Cl.
CPC .......... *B01L 3/021* (2013.01); *G01N 35/1011* (2013.01)

(58) Field of Classification Search
None
See application file for complete search history.

(56) References Cited

U.S. PATENT DOCUMENTS 4,527,437 A * 7/1985 Wells ........................ B01L 3/021 422/922
5,306,510 A * 4/1994 Meltzer .............. G01N 35/1072 422/561
9,689,884 B2 * 6/2017 Peetz ........................ B01L 9/543
11,524,287 B2 * 12/2022 Limbach ............... B01L 3/0289
2005/0238544 A1 * 10/2005 Briscoe .................... F16H 19/04 422/562
2010/0212437 A1 * 8/2010 O'Caoimh ............. C12M 33/04 73/864.11
2011/0209564 A1 * 9/2011 Von Beichmann ....... B01L 9/00 73/864.01
2013/0233095 A1 * 9/2013 Wilmer .................... B01L 3/021 73/864.01
2013/0239706 A1 * 9/2013 Link ........................ B01L 3/021 73/864.01
2013/0291660 A1 * 11/2013 Wilmer .................... B01L 3/021 73/864.13
2016/0266162 A1 9/2016 Liu et al.
2016/0341755 A1 * 11/2016 Wilmes .................... B01L 3/021
2017/0108525 A1 * 4/2017 Liu ..................... G01N 35/1065
2017/0354965 A1 * 12/2017 Cote ...................... B01L 3/0217
2019/0329237 A1 * 10/2019 Schroer .................. B01L 3/0286
2019/0391173 A1 * 12/2019 Bolli ...................... B01L 3/0279
2020/0139318 A1 * 5/2020 Moskalev ............... B01L 3/021
2020/0166325 A1 5/2020 Ausserlechner et al.
2021/0394170 A1 * 12/2021 Kunsch .............. G01N 35/1011
(Continued)

FOREIGN PATENT DOCUMENTS

EP 2410342 A2 1/2012

*Primary Examiner* — Brian R Gordon
(74) *Attorney, Agent, or Firm* — William Gray Mitchell

(57) ABSTRACT

A pipetting device, a system comprising the pipetting device, and a system for handling liquids and providing a pipetting device, the pipetting device comprising a housing accommodating a shaft connected to a drive; and a second drive which is connected to the housing and comprises a gear wheel that is arranged next to an opening in the housing.

13 Claims, 6 Drawing Sheets

(56) References Cited

U.S. PATENT DOCUMENTS

2023/0077554 A1* 3/2023 Hunt ...................... G01N 1/312
422/536
2023/0250418 A1* 8/2023 Wang Keng Meng ...................... G01N 35/0098
506/26
2024/0248108 A1* 7/2024 Schneider .......... G01N 35/1011

* cited by examiner

PIPETTING UNIT

CROSS-REFERENCE TO RELATED APPLICATIONS

The present application claims priority to Luxembourg Patent Application No. LU 102878 filed on Nov. 15, 2021. The aforementioned application is hereby incorporated by reference in its entirety.

BACKGROUND OF THE INVENTION

Field of the Invention

The invention relates to a pipetting device, a system comprising said pipetting device and a system for handling liquids.

Brief Description of the Related Art

Automated analyser systems for use in clinical diagnostics and life sciences are produced by a number of companies. For example, STRATEC® SE, Birkenfeld, Germany, produces a number of devices for specimen handling and detection for use in automated analyser systems and other laboratory instrumentation.

STRATEC designs and manufactures automated analyzer systems like diagnostic systems for biochemically processing samples, in particular patient samples. Such analyzer systems usually have a liquid handling device, which comprises a pipetting device for aspirating or dispensing liquids in receptacles like multi well plates which are flat plates having a plurality of wells for taking up or providing a liquid.

To speed up handling of liquids in automated analyser systems, multi-needle pipettors are often used to increase the throughput of samples to be analysed by pipetting in parallel from or into multiple wells.

With known multi-needle pipettors for pipetting distances of 9 mm which corresponds to a 9 mm grid of multi well plates, difficulties arise related to the arrangement of the components of a pipettor unit including drives and bearings for instance. The known designs of multi-needle pipettors do not allow the pipetting units to be arranged in any position because of their hardware setup. The pipetting units cannot easily be exchanged and the adjustment and alignment of the axes of a pipettor unit's probe to each other requires considerable effort.

The pipetting units are usually arranged offset for multi-needle pipetting to be able to realise a pipetting distance of 9 mm. Powerful drives with encoders which are required to drive the pipetting units in the Y and Z directions, can be located at the top or bottom of the pipetting units. The arrangement depends on the respective positioning in the multi-needle pipetting unit. This nested structure results in different pipetting units that cannot be positioned arbitrarily in relation to each other. The Z-axis of a pipetting unit dips through the neighbouring pipetting unit. Removal of individual pipetting units is only possible with difficulty and represents a considerable effort in the service case.

Published U.S. patent application US 2016/266162 A1 discloses a pipetting workstation comprising a pipetting mechanism bracket and a plurality of pipetting mechanisms; wherein, the pipetting mechanism comprises a mobile seat, a mobile rod movably mounted on the mobile seat; a mobile rod drive mechanism; a gear capable of turning around the vertical direction; a linear rail fastening seat; and a pipette disposed at the lower end of the mobile rod. US 2016/266162 A further discloses the abovementioned pipetting mechanism and provides usage of the pipetting workstation in such aspects as liquid sample dosing and liquid transferring. The pipetting mechanism used in the pipetting workstation provided US 2016/266162 A can independently make vertical or horizontal movements, and does not require or reduces lubricating services, which accordingly avoid contamination.

Published European patent application EP 2 410 342 A2 teaches A device for aspirating and dispensing more than one liquid sample, said device comprising-a main frame body—more than one pipetting units, said pipetting units extending side by side in parallel with each other; wherein a pipetting unit comprises—an interface for interacting with an interface of a pipette tip, —a first module for aspirating and dispensing a liquid, —a second module for Y-axis movement, and third module for Z-Axis movement, wherein said second and third modules are function independently; —a fourth module for controlling functions of said pipette unit—two frames for receiving at least one of said modules, wherein said at least one module is mounted in one of said frames, —an X-transfer mechanism connected to said main frame body to which said pipetting units are connected; wherein said at least one module of one pipette unit is mounted in one of said two frames, and said at least one module of the adjacent pipette units are mounted in the frame in the location corresponding to the frame of said first pipette unit which is empty.

Published U.S. patent application US 2020/166325 A1 discloses a magnetic angle sensor device and a method for operating such device is provided. The magnetic angle sensor device includes a shaft rotatable around a rotation axis; a magnetic field source coupled to the shaft; a first magnetic angle sensor configured to generate a first signal that represents a first angle based on a first diametric magnetic field from the magnetic field source applied to the first magnetic angle sensor; a second magnetic angle sensor configured to generate a second signal that represents a second angle based on a second diametric magnetic field from the magnetic field source applied to the second magnetic angle sensor; and a combining circuit configured to determine a combined rotation angle based on the first signal and on the second signal.

Published U.S. patent application US 2010/212437 A1 discloses an apparatus for withdrawing respective liquid samples from vials which are closed by closure caps penetrable by a pointed cannula comprises a plurality of racks for accommodating the vials. The device comprises a housing that is slidably carried on a gantry which in turn is slidably carried on guide tracks to provide two degrees of movement of the device for selective alignment of the device with the vials. An abutment member which is vertically slidable in the housing of the device is driven by a second gearwheel by a drive shaft along which the housing is slidably mounted through a first gearwheel and a dog clutch. A cannula which is secured within a first gear rack is driven upwardly and downwardly within the housing by the first gearwheel which is driven by the drive shaft. On engagement of the abutment member with the closure cap of the selected vial, the clutch decouples the second gearwheel from the first gearwheel so that the cannula is urgeable through the closure cap into the vial for withdrawing the liquid sample. The clutch retains the second gearwheel decoupled from the first gearwheel until the cannula has been withdrawn from the closure cap to prevent displacement of the closure cap during withdrawal of the cannula therethrough.

Thus, there is a need for a pipetting unit allowing a simplified arrangement, positioning and exchange of the pipetting unit.

SUMMARY OF THE INVENTION

It is therefore the object of this invention to provide a pipetting unit which allows a simplified arrangement, positioning and exchange of the pipetting unit.

The present invention provides a pipetting device, comprising a housing with two parallel flat surfaces with a maximal distance of 17.5 mm between them, wherein the housing surrounds a Z-shaft which is pushed by by two L-bearings with spring loaded counter bearings with a first outer surface towards a first longitudinal end of the housing, wherein the outer surface of the Z-shaft opposite the first surface is toothed; and wherein the housing further comprises a Z motor gear unit with a Z-drive and a Z-drive gear wheel which engages with its teeth into the toothed surface of the Z-shaft for actuating it; and wherein the housing further comprises a Y-drive comprising a Y-drive gear wheel that is arranged next to an opening in the housing configured for accommodating a Y-gear rod.

In a further aspect of the present invention, the Z-drive is a Z-drive motor comprising a diametrically magnetised round magnet at a Z-drive motor shaft's first end and an opposite end of the Z-drive motor shaft comprises a circuit board arranged encoder chip for determining the rotation angle of a magnetic field so that the position of the Z-drive's motor shaft can be determined.

The housing may comprise a slotted light barrier for initialising the Z-shaft in a further embodiment.

In another embodiment, a first end of the Z-shaft comprises an integrated pipetting pump for providing or taking up liquids.

In another aspect of the invention, the Y-drive is a Y-drive motor which is connected to the housing.

In a further embodiment, an axis of the Z-drive gear wheel for engaging into the toothed surface of the Z-shaft is mounted to a plate which can be fixed by a clamping screw in an oblong hole, wherein the clamping screw can be moved in the oblong hole for adjusting the position of the axis.

The device may also encompass that the Z-drive gear wheel is made of a compressible material or has between its outer circumference and its axis a shape configured to allow a play compensation.

The invention relates also to a device, wherein the Y-drive gear wheel is arranged at a first side of the opening and on the opposite side to the first side of the opening is a ball bearing arranged as a counter bearing.

The device may also comprise a Z-drive motor gear unit between the Z-drive motor shaft's end of the Z-drive and the Z-drive gear wheel.

Another object of the invention is a system for handling of liquids, comprising a pipetting device as described in the previous paragraphs.

The system may also comprise a Y-drive gear rack that is guided through the opening in the housing into which the Y-drive gear wheel of the Y-drive engages.

Another embodiment of the invention relates to a system, wherein the housing comprises on an outer surface at least two vertically spaced ball bearings for arranging a guiding bar between them.

In another aspect, a first of the at least two vertically spaced ball bearings is connected to an adjusting slide for moving the first ball bearing vertically for adjusting the distance between the at least two ball bearings.

In a further embodiment of the system, at least one of the at least two ball bearings is mounted on an eccentric for adjustment of a height of the housing.

The system as described in the previous paragraphs may also comprise further slide bearings which are arranged in openings of the housing for supporting movements of the pipetting device in Y-direction.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The technical problem is solved by the independent claims. The dependent claims cover further specific embodiments of the invention.

The present invention provides a universal pipetting unit which is a device that may be installed in automated analyser systems like diagnostic devices wherein the pipetting unit has a maximum width of 18 mm. The compact design of the pipetting unit with a maximum width of 18 mm is necessary to realise a pipetting distance of 9 mm (grid of microtiter plates) when the pipetting units are arranged opposite and staggered to each other. To allow for tolerances, a maximum width of 17.5 mm is also envisaged for the pipetting unit. The design of the cassette housing is based on a very flat Z-axis drive with special gearing and a compact Y-drive to make it possible to comply with the maximum width. The housing of such a pipetting unit has two flat surfaces with a distance of 18 mm or 17.5 mm between the outer surfaces of the housing.

The pipetting unit can be installed or arranged in any position of a multi-needle pipettor due to its flat design. No conversion or individual adaptation of the pipetting unit is necessary. This saves costs for production, service and spare parts stocking. The following description of the drawings relates to embodiments of a multi-needle pipettor according to the present disclosure with exemplary arrangement of the pipetting units.

Figure 1:
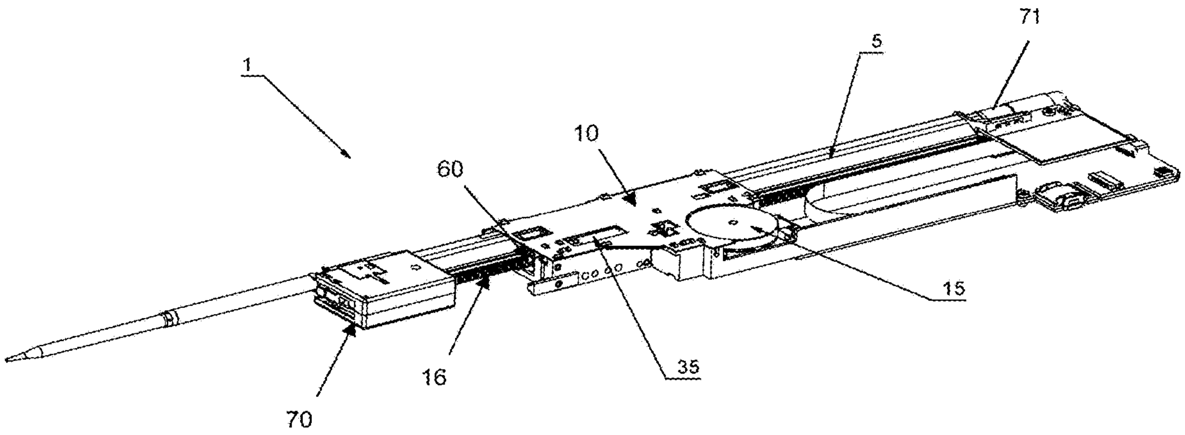
FIG. 1 shows a single pipetting unit.

FIG. 1 shows a single pipetting unit 1. The pipetting unit 1 comprises a Z-shaft 5 and a housing 10. The housing 10 which may also be designated as a cassette comprises the Z-shaft 5 by surrounding it and further surrounds Z-drive 15, Y-drive 35 and associated electronics (not shown) for controlling the Z-drive 15 in the housing's 10 flat design. The housing 10 comprises further, guides for the Z- and Y-shaft (not shown in detail).

A pipetting unit 70 comprising a pipetting pump (not shown) is arranged at a first end of the Z-shaft 5 and connected to a pipetting pump 71, embodied as a drive and piston extending to the pipetting unit 70. The pipetting unit 70 moves upwards and downwards whenever the Z-shaft 5 is actuated by the rotating Z-drive gear wheel 25 which engages into the toothed surface 16 of the Z-shaft 5.

Figure 2:
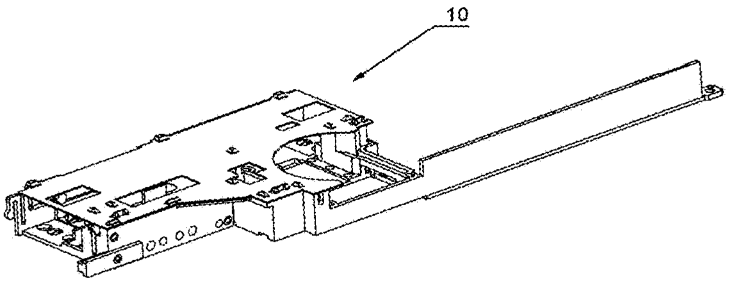
FIG. 2 shows a housing.

The housing 10 (FIG. 2) can be made of different materials. It can be made of an injection molded part with a stiffening plate, or alternatively it may be milled from a metal part or made of zinc or aluminum via a die casting process.

Figure 3A:
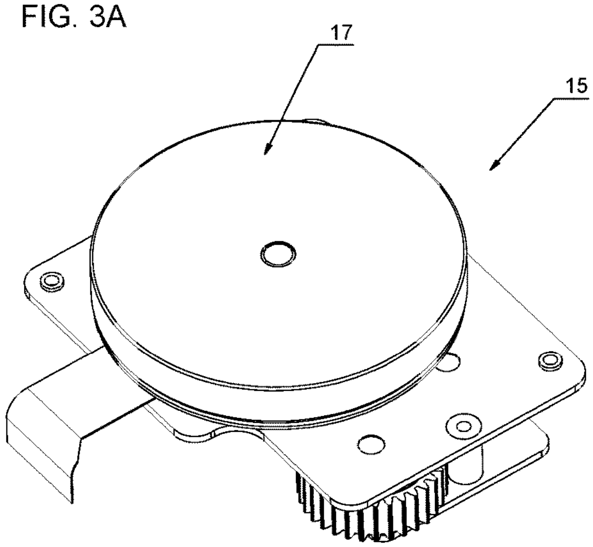
FIG. 3A shows a Z-drive comprising a flat motor-gear unit.
Figure 3B:
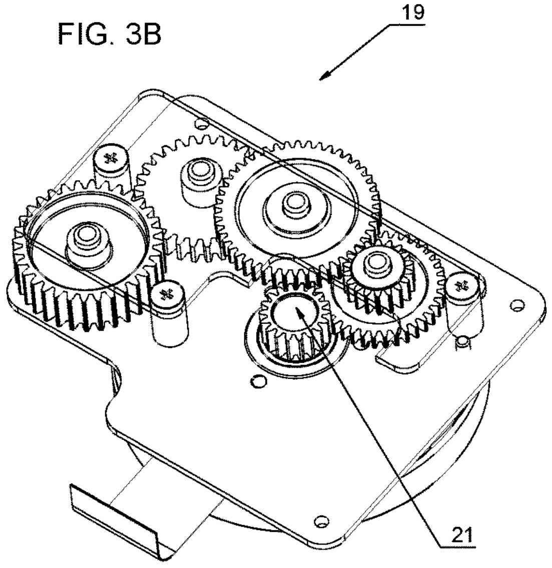
FIG. 3B shows the backside of a Z-drive comprising a flat motor-gear unit.
Figure 3C:
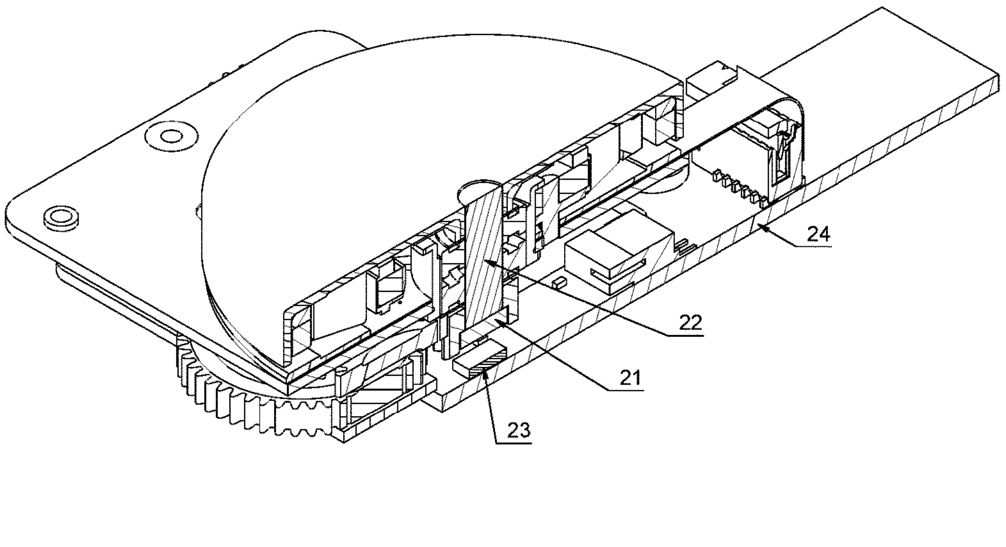
FIG. 3C shows a sectional view through a Z-drive comprising a flat motor-gear unit.

The Z-shaft 5 has a toothed surface 16 and the Z-drive 15 which comprises a flat Z-drive motor-gear unit 19 with a Z-drive gear wheel 25 engaging with its teeth into the toothed surface 16 of the Z-shaft 5, which is shown in FIG. 3A. The flat Z-drive motor gear unit 19 can be in an embodiment an EC gear motor 17 (FIG. 3B) which is used to move the Z-shaft. The Z-drive contains a diametrically magnetized round magnet 21 at a first end of the motor shaft 22. The associated encoder chip 23 is located on a circuit board 24 on the opposite side of the motor axis and the magnet 21, as shown in FIG. 3C.

Figure 8:
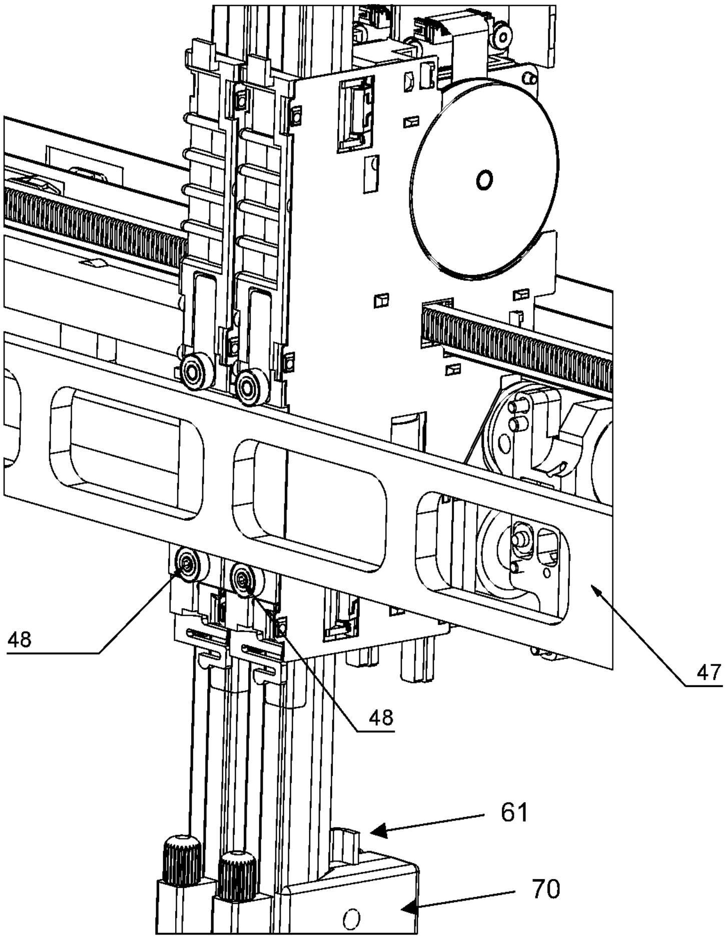
FIG. 8 shows a cassette on a guiding bar.

This arrangement is used to determine the angle of rotation of the magnetic field and to determine an exact position of the Z-shaft. The Z-shaft of the pipetting unit is initialized via a slotted light barrier 60 which is arranged on the side of the housing facing the pipetting unit 70 (comp. FIG. 1). A pin 61 (comp. FIG. 8) is arranged on the side of the pipetting unit facing the housing 10. When pin 61 interrupts the light beam of the slotted light barrier 60, the position of the pipetting unit 70 and the housing 10 to another are known. Starting from this known position and combining it with the determined angle of rotation performed by the Z-drive, it is possible to exactly determine the distance between pipetting unit 70 and housing 10. Compared to the state of the art, this arrangement is narrower and allows the identical pipetting units to be arranged in the 9 mm grid of the microtiter plates.

Figure 4:
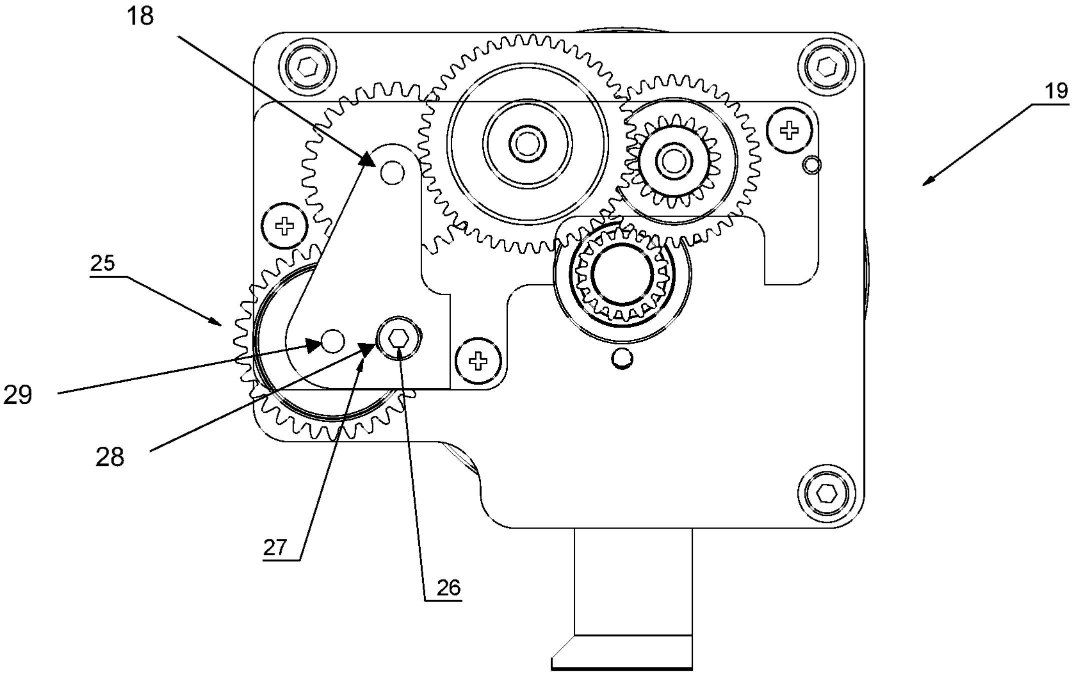
FIG. 4 shows the Z-drive motor gear unit.

FIG. 4 shows the Z-drive motor gear unit 19. The play between the toothed surface 16 of the Z-shaft 5 (not shown) and a Z-drive gear wheel 25 engaging in said toothed surface 16 is adjusted by means of a clamping screw 26 which can be moved in an oblong hole 28 for fixing a plate 27 to which the axis 25 of the Z-drive gear wheel is fixed. Once the adjustment has been made, plate 27 is fixed with clamping screw 26. Plate 27 rotates around axis 18 of a gear wheel of the Z-drive motor gear unit which actuates the Z-drive gear wheel 25.

Figure 5:
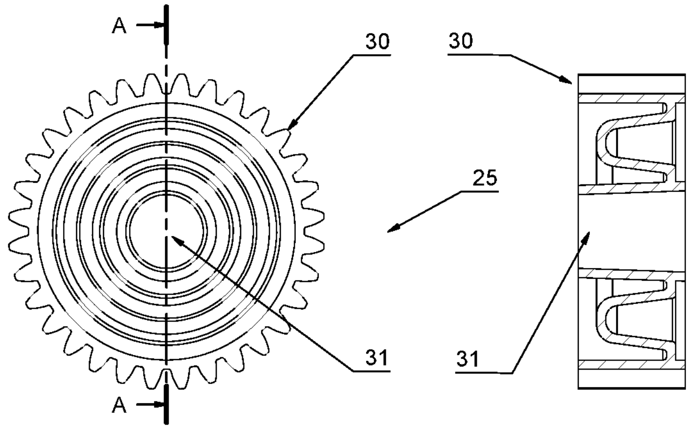
FIG. 5 an inherently resilient Z-drive gear wheel.

FIG. 5 shows an alternative to an adjustment by a movable plate. Alternatively, as shown in FIG. 4, an inherently resilient Z-drive gear wheel 25 can be used for the Z-drive in order to realize a backlash-free installation. Such a gear wheel 25 may have a design with an elastic or compressible material arranged between outer gearing 30 and a centrally arranged hole 31. Alternatively, the shape of a material between outer gearing 30 an the centrally arranged hole 31 may allow a play between them, as FIG. 5B shows an S-shape in the sectional view on the right side of FIG. 5B. Different shapes like a Z-shape, a C-shape or other shapes may also be used.

Figure 6A:
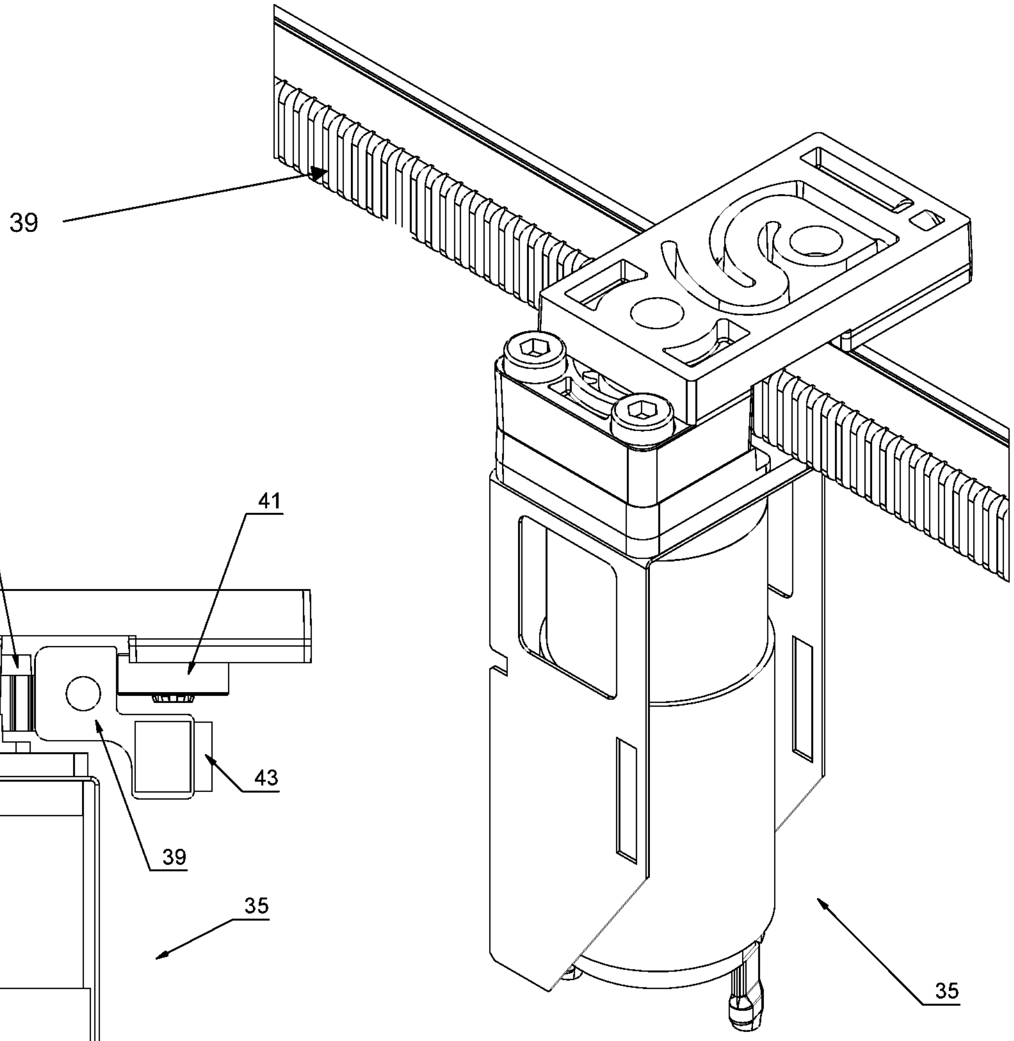
FIGS. 6A and 6B are perspective and side views, respectively, showing a compact gear motor as Y-drive which engages into a Y-drive gear rack.
Figure 6B:
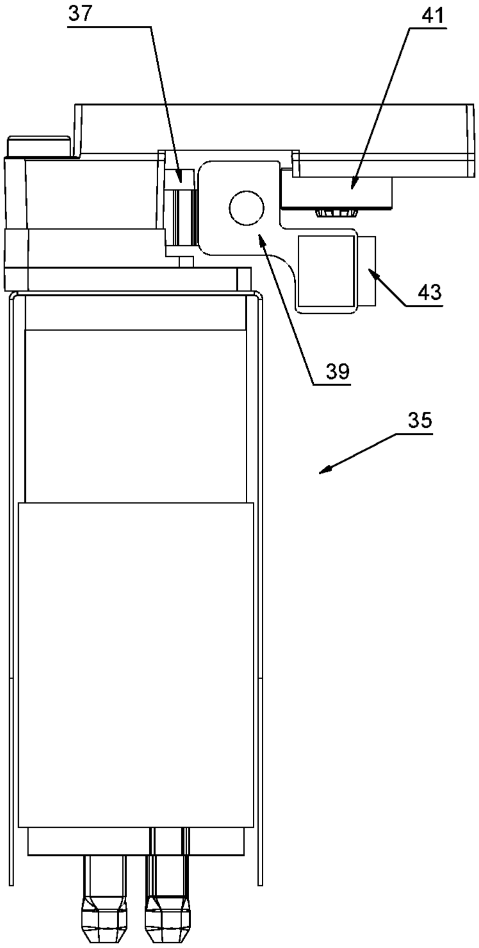

FIGS. 6A and 6B show that a Y-drive 35 which may be provided by a compact DC gear motor (not shown) which is flexibly (elastically mounted in the X-direction) connected to the housing 10 (not shown). A Y-drive gear wheel 37 is mounted to the Y-drive motor shaft (not visible) for engaging into the toothed Y-drive gear rack 39. The Y-drive gear wheel 37 is guided by a deep-groove ball bearing 41 for the Y-drive. A magnetic tape encoder 43 is integrated into the housing (not shown) to determine the respective Y-position of the pipetting unit (not shown). A magnetic tape (not shown) is also attached to the toothed Y-drive gear rack 39.

Figure 7:
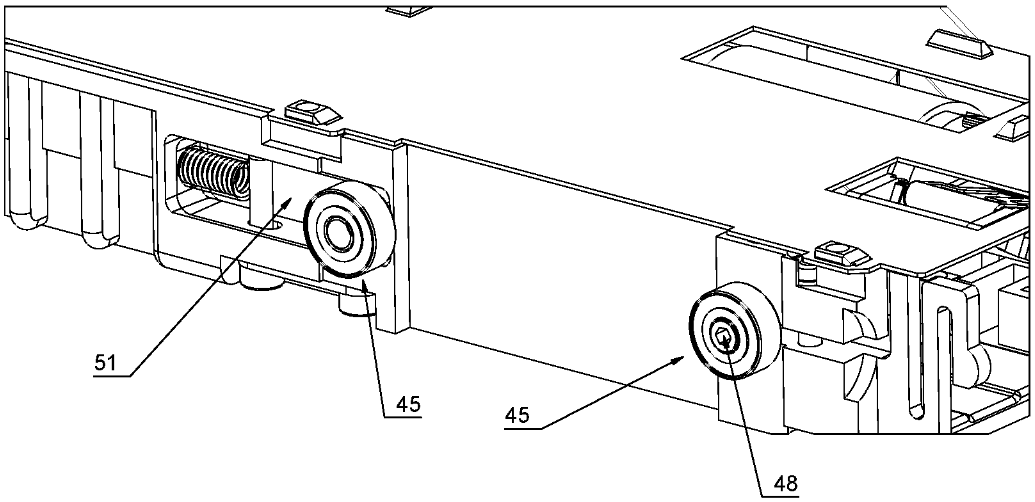
FIG. 7 shows a spring-loaded adjustment slide.

The pipetting unit is guided in the Y-direction by slide bearings 55 (FIG. 10) on a cylindrical profile and by ball bearings 45 on a right-angled guiding bar 47 (FIG. 8). The position of the cassette on a guiding bar can be adjusted vertically via the eccentrically mounted ball bearing 45, 48 (FIG. 7, 8). The pressure spring in the spring-loaded adjustment slide 51 of the second ball bearing automatically ensures a play-free movement between the ball bearing and the guiding bar.

Figure 9:
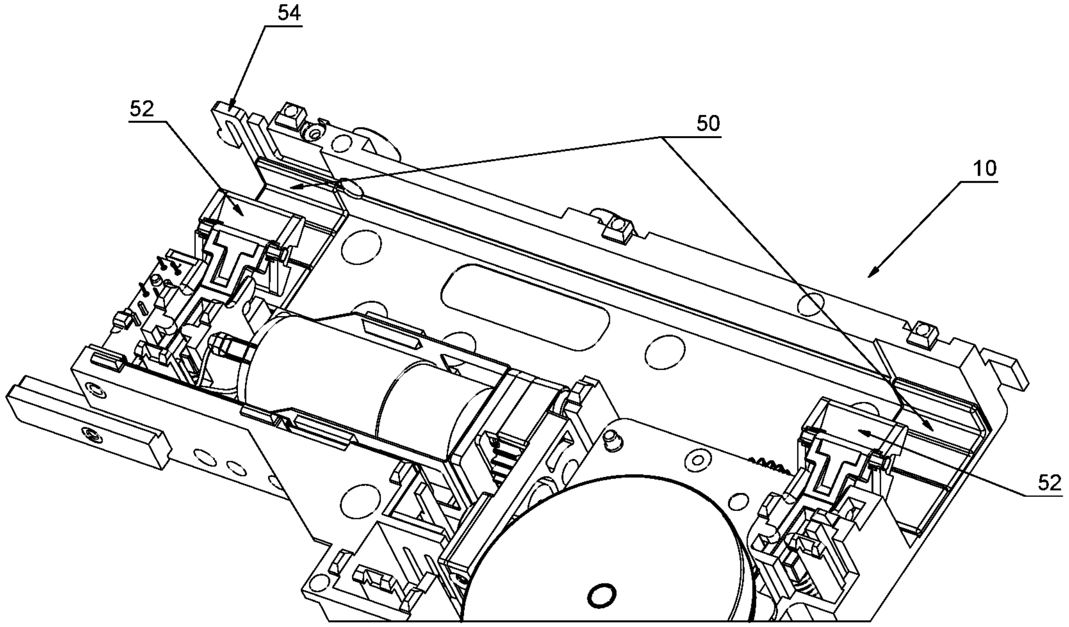
FIG. 9 and FIG. 10 show a Z-shaft guiding in more detail.
Figure 10:
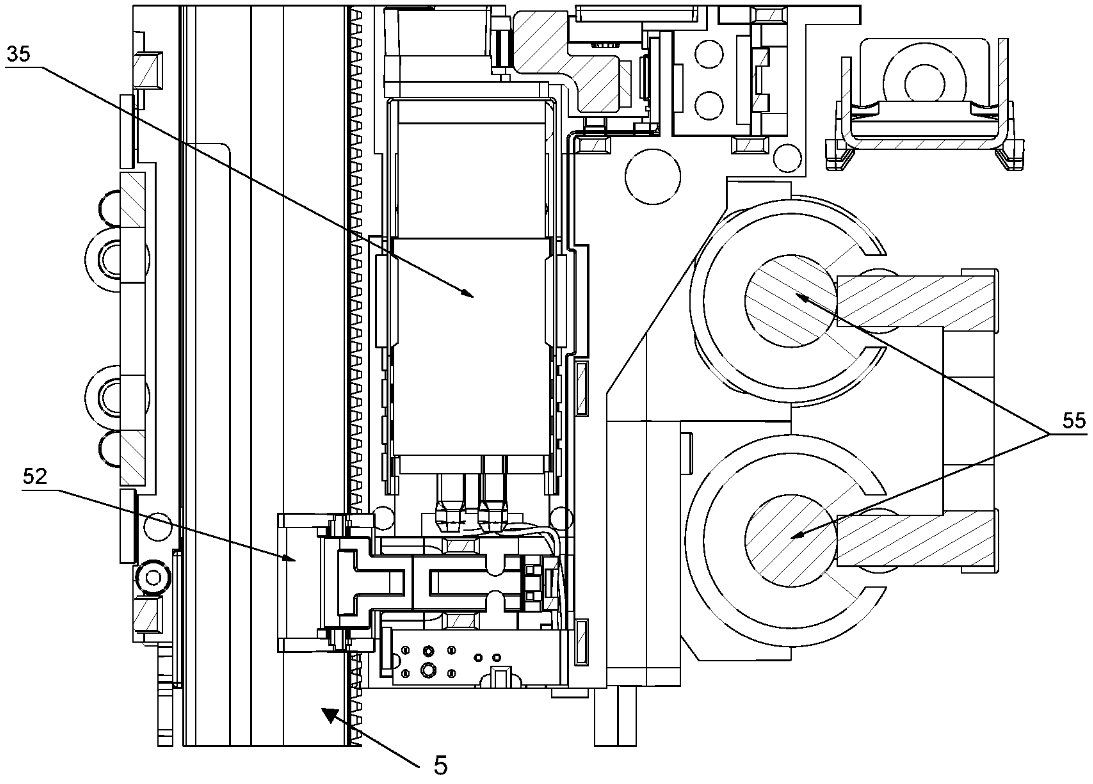

FIG. 9 and FIG. 10 show a Z-shaft guiding in more detail. The guiding enables a horizontal positioning and vertical movement of the Z-shaft (not shown). The Z-shaft is pushed by two L-bearings 50 with spring loaded counter bearings 52 towards a first longitudinal end of the housing 10. The friction must be high enough to hold the weight of the Z-shaft and at the same time small enough to keep the required force of the motor for actuating as low as possible.

During assembly or servicing, when the pipetting unit is in a de-energized state, the drive can be damaged if the Z-shaft is moved manually. To safeguard against this case of failure, the Z-shaft can be cushioned with a spring 54 (FIG. 9). Alternatively, the motor can be short-circuited via a relay in the de-energized state, so that a braking effect is created by the motor when the rack is pushed up manually.

FIG. 10 shows Y-drive 35 and spring of counter bearing 52 for keeping the Z-shaft 5 in its position within the housing. FIG. 10 shows also slide bearings 55 which guide the pipetting unit in a Y-direction.

The advantages of a system according to the present disclosure relate to the following:

a. Due to the compact design of the cassette with a module width of 17.5 mm, a modular design with 18 mm pitch is possible.
b. A pitch of 9 mm is possible with opposite and displaced arranged pipetting units.
c. The cassette can be installed in any position of the pipetting arm without conversion. This is a great advantage especially in case of services which have to be done.

d. It results in cost savings for production, service and for spare parts stocking:
   i. Less time required to replace (remove, adjust) individual Z-axes.
   ii. Lower spare parts inventory, as there is a smaller variation of spare parts.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERAL

1 pipetting unit
5 Z-shaft
10 housing
15 Z-drive
16 toothed surface Z-shaft
17 EC motor
18 axis of gear wheel of Z-drive motor gear unit
19 Z-drive motor gear unit
21 magnet
22 Z-drive motor shaft
23 encoder chip
24 circuit board
25 Z-drive gear wheel
26 clamping screw
27 plate
28 oblong hole
29 axis of Z-drive gear wheel
30 gearing Z-drive gear wheel
31 central hole Z-drive gear wheel
35 Y-drive
37 Y-drive gear wheel
39 Y-drive gear rack
41 ball bearing Y-drive
43 magnetic tape encoder
45 ball bearing
47 guiding bar
48 eccentric
50 L-bearing
51 spring loaded adjustment slide
52 counter bearing
54 spring
55 slide bearing
60 slotted light barrier
61 pin
70 pipetting unit
71 pipetting pump

We claim:

1. A pipetting device, comprising:
- a housing comprising a top, a bottom, two sides and two longitudinal ends, wherein the two sides are embodied as two parallel flat surfaces separated by a maximal distance of 17.5 mm wherein one of the two sides comprises an opening;
- a Y-drive embodied as a motor and comprising a Y-drive gear wheel;
- a Z-drive comprising a Z-drive motor gear unit, a Z-drive gear wheel comprising teeth, a Z-shaft with a toothed surface, such Z-shaft comprising a first end;
- a pipetting unit comprising a pipetting pump, such pipetting unit connected to the first end of the Z-shaft;
- two L-bearings; and
- two counter-bearings, each loaded with a spring and each comprising a first surface facing a first longitudinal end of the housing;
- wherein the housing surrounds the Z-shaft and the Z-shaft is engaged by the two L-bearings,
- wherein the housing further comprises
  - (i) the Z-drive motor gear unit arranged such that the teeth of the Z-drive gear wheel engages with the toothed surface of the Z-shaft for actuating the Z-shaft; and
  - (ii) the Y-drive gear wheel is arranged facing the opening of the housing.

2. The pipetting device of claim 1, wherein the Z-drive is a Z-drive motor comprising a Z-drive motor shaft comprising a first end and an opposite end,
- wherein the first end of the Z-drive motor shaft comprises a diametrically magnetized round magnet and the opposite end of the Z-drive motor shaft comprises a circuit board encoder chip for determining a rotation angle of a magnetic field and thus a position of the Z-drive motor shaft.

3. The pipetting device of claim 1, wherein the housing comprises a slotted light barrier on a side of the housing facing the pipetting unit for determining positioning of the housing relative to the pipetting unit.

4. The pipetting device of claim 1, wherein the Z-drive comprises
- a plate which is fixed by a clamping screw in an oblong hole of the plate and an axis of the Z-drive gear wheel for engaging into the toothed surface of the Z-shaft is mounted to the plate,
- wherein the clamping screw is configured to be moved in the oblong hole to adjust a position of the Z-drive gear wheel axis.

5. The pipetting device of claim 1, wherein the Z-drive gear wheel is made of a compressible material or has between an outer circumference of the Z-drive gear wheel and an axis of the Z-drive gear wheel, one of a Z-shape, C-shape or S-shape configured to allow for a play compensation.

6. The pipetting device of claim 1, wherein the Y-drive gear wheel is arranged at a first side of the opening in the housing and a counter bearing on a second side of the opening of the housing.

7. The pipetting device of claim 2, the Z-drive motor shaft's first end connects to a first side of the Z-drive motor gear unit and the Z-drive gear wheel connects to a second side of the Z-drive motor gear unit.

8. A method of handling liquid using the pipetting device of claim 1, the method comprising:
- actuating the Z-shaft by engaging the teeth of the Z-drive gear while with the toothed surface of the Z-shaft and rotating the Z-drive gear;
- pushing the Z-shaft toward a longitudinal end of the housing with the two L-bearings to drop the pipetting unit into a liquid receptacle,
- engaging the pipetting pump, which is integrated with the Z-shaft, to inject liquid into the liquid receptacle or take up liquid from the liquid receptacle, and withdrawing the pipetting unit from the fluid receptacle by reversing the Z-drive gear rotation.

9. The method of claim 8, further comprising a Y-drive gear rack arranged through the opening of the housing and connected to the Y-drive gear wheel.

10. The method of claim 8, wherein the top of the housing comprises a top surface comprising at least two vertically spaced ball bearings, and a guiding bar is connected to the top surface between the at least two vertically spaced ball bearings.

11. The method of claim 10, wherein a first of the at least two vertically spaced ball bearings is connected to an adjusting slide for moving the first ball bearing vertically for adjusting the distance between the at least two ball bearings.

12. The method of claim 10, wherein the top surface of the housing comprises at least one eccentric, and at least one of the at least two ball bearings is mounted on the at least one eccentric for adjustment of the housing.

13. The method of claim 8, wherein the housing further comprises one or more openings, each of the one or more openings comprising a slide bearing.

* * * * *